United States Patent [19]
Ito

[11] Patent Number: 5,854,951
[45] Date of Patent: Dec. 29, 1998

[54] FINDER

[75] Inventor: Kazumi Ito, Mitaka, Japan

[73] Assignee: Olympus Optical Co., Ltd., Tokyo, Japan

[21] Appl. No.: 796,022

[22] Filed: Feb. 5, 1997

[30] Foreign Application Priority Data

Feb. 6, 1996 [JP] Japan .................................. 8-020102

[51] Int. Cl.$^6$ .................................................. G03B 13/10
[52] U.S. Cl. ............................................................ 396/378
[58] Field of Search .................................. 396/376, 378, 396/379, 380, 381, 382

[56] References Cited

U.S. PATENT DOCUMENTS

| | | | |
|---|---|---|---|
| 4,715,692 | 12/1987 | Yamada et al. | 396/380 |
| 4,909,614 | 3/1990 | Itoh et al. | 396/380 |
| 5,055,868 | 10/1991 | Itoh et al. | 396/379 |
| 5,495,367 | 2/1996 | Morooka | 359/674 |

FOREIGN PATENT DOCUMENTS

| | | |
|---|---|---|
| 5-232547 | 9/1993 | Japan . |
| 5-288990 | 11/1993 | Japan . |
| 5-289147 | 11/1993 | Japan . |
| 6-018780 | 1/1994 | Japan . |
| 6-138387 | 5/1994 | Japan . |

*Primary Examiner*—Russell E. Adams
*Attorney, Agent, or Firm*—Cushman Darby & Cushman IP Group of Pillsbury Madison & Sutro LLP

[57] ABSTRACT

A finder is designed so that in a camera having three or more kinds of formats, a finder magnification can be changed in association with conversion of format, and for conversions into at least two kinds of formats of the three or more kinds of formats, finder magnifications are changed at the same magnification ratio by the same technique.

8 Claims, 3 Drawing Sheets

FINDER

BACKGROUND OF THE INVENTION

1. Field of the Invention

This invention relates to an optical real image finder or electronic viewfinder used in a camera or video camera which is capable of photographing with a plurality of picture-framing formats.

2. Description of Related Art

A conventional 35 mm camera that can take standard-size and panoramic-size pictures typically has a plurality of, or two picture-framing formats.

When the format for the panoramic-size picture is selected, the frame of the finder view conforming to the standard-size picture is masked at its top and bottom portions. Thus, if a finder magnification remains unchanged, an apparent field of view becomes narrower. In order to repair this defect, as disclosed, for example, in Japanese Patent Preliminary Publication Nos. Hei 5-289147 and Hei 6-18780, cameras are constructed such that when the format is changed to select the panoramic-size picture, the finder magnification is increased so that the apparent field becomes wider. In this way, the finder magnification is properly changed in accordance with the picture-framing format selected, and thus the viewer is given the constant visual impression with respect to the frame size of the finder view.

If this technique should be applied to a camera that has at least three picture-framing formats, a complicated variable magnification system including a substantial number of optical elements for magnification change, zooming mechanism, etc. would be required for changing magnification in compliance with the change of picture-framing formats. This constitutes a serious obstacle to the realization of the compactness and cost reduction of the camera.

SUMMARY OF THE INVENTION

The present invention is directed to a finder for a camera provided with at least three picture-framing formats.

An object of the present invention is to provide such a finder that the differences in apparent size between the frames of the finder view conforming to these at least three formats are moderated while the camera including the finder is made to be compact and at low cost. In order to attain this object, the finder magnification is changed between values conforming to two picture-framing formats and between values conforming to another combination of two picture-framing formats using a common magnification changing means.

Specifically, for a camera provided with at least three picture-framing formats, the finder is designed so that the finder magnification is changed at the same magnification ratio by the same means in association with alternation between two picture-framing formats as well as in association with alternation between at least one other combination of two picture-framing formats.

Further, for a camera provided with at least three picture-framing formats, the finder is designed so that the finder magnification is changed at the same magnification ratio by the same means in association with alternation between two picture-framing formats as well as in association with alternation between another combination of two picture-framing formats.

Still further, for a camera provided with three different picture-framing formats, the frames of the finder view conforming to the second and third picture-framing formats are constructed based on the frame conforming to the first picture-framing format, so that they are narrower than the base frame in vertical and horizontal directions, respectively. The finder magnification is changed from the first magnification to the second magnification in association with conversion of the first picture-framing format into whichever of the second and third picture-framing formats, using the same magnification changing means.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the explanation of the embodiments, it will be expedient to describe the principle of enlargement of the frames by a change in magnification of the finder according to the present invention.

An apparent size of each frame viewed through the finder can be considered equivalent to the tangent of the visual angle of frame diagonal where the frames are not very different in aspect ratio. The aspect ratios of frames of ordinary cameras range from about 1:1 to 1:2, and thus little problem is caused even though the frame size is regarded equivalent to the tangent of the visual angle of the frame diagonal. In general, if the aspect ratio of a frame exceeds a certain value (namely, the frame is very oblong horizontally), the frame appears smaller even though the visual angle of the frame diagonal remains unchanged. Hence, it becomes difficult to discuss the frame of a larger aspect ratio in the same manner as the above description. Specifically, where the frame is so much oblong horizontally that the aspect ratio thereof exceeds about 1:3 or 1:4, it is not desirable to discuss the size of an apparent image viewed through the finder by the tangent of the frame diagonal. Below these aspect ratios, however, there is no problem. Here, using the tangent of the visual angle of the frame diagonal, a description will be given of the technique of reconciling the apparent sizes of a plurality of frames which are simple to construct and have different sizes.

Figure 1:
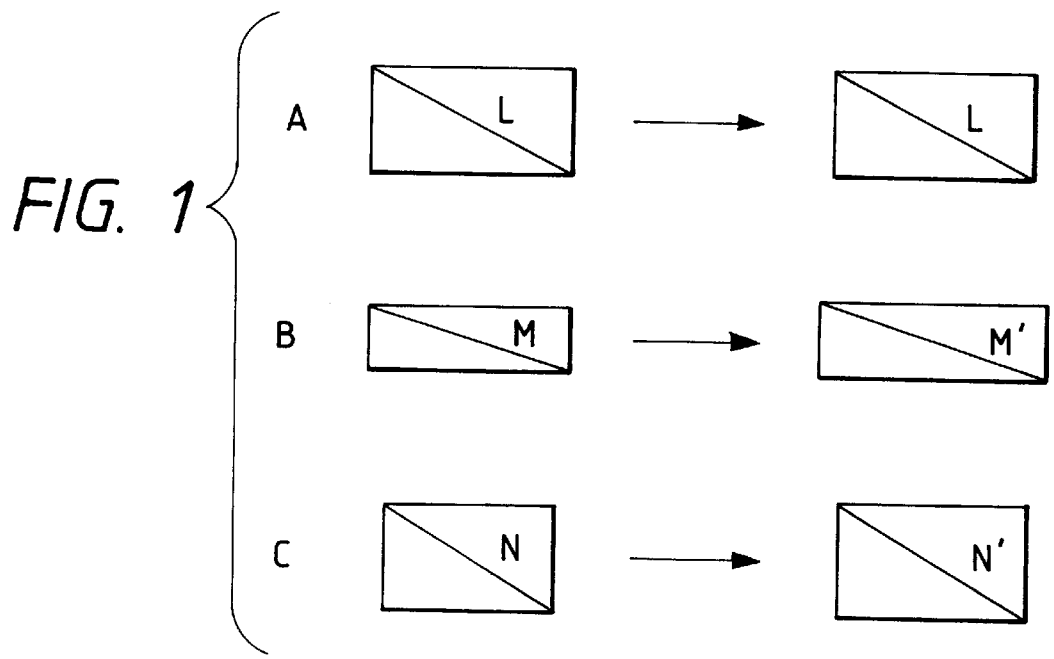
FIG. 1 is a view for explaining the principle of the enlargement of frames of the finder view according to the present invention.

As shown in FIG. 1, of three frames A, B, and C of different sizes, the frames B and C are enlarged with the same magnification ratio so that there is little difference in apparent size as shown on the right-hand side of the figure. In this case, when visual angles of the frame diagonals of the frames A, B, and C as viewed through the finder in the same magnification are taken as θ, φ, and ω, and the values of tangents of these as L, M, and N, respectively, L, M and N are expressed by $$L = \tan\theta \quad (1)$$

$$M = \tan\phi \quad (2)$$

$$N = \tan\omega \quad (3)$$

In this case, the frames A, B and C are determined so that L>M>N.

Further, in the present invention, it is desirable that the condition $$MM - LN > 0 \quad (4)$$

is satisfied.

Simultaneously, the frames B and C are enlarged with the same magnification ratio β. The desirable range of this magnification ratio β is determined by $$1.8 < \beta(M+N)/L < 2.2 \quad (5)$$

and further it is more desirable that the magnification ratio β is set to satisfy $$\beta = 2L/(M+N) \quad (6)$$

In the present invention, the magnification of the finder can be changed by adding a converter lens to a lens system constituting the finder, varying distances between lenses constituting the finder, or enlarging an intermediate image (by changing the focal length of an objective lens in a real image mode finder, or by changing an indication size in an electronic finder).

Figure 2A:
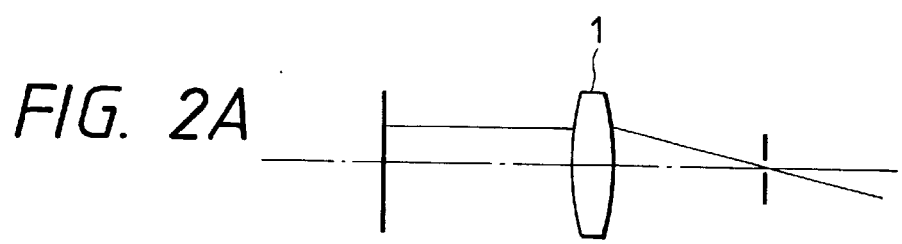
FIGS. 2A and 2B are views showing arrangements of the finder that allows the enlargement shown in FIG. 1.
Figure 2B:
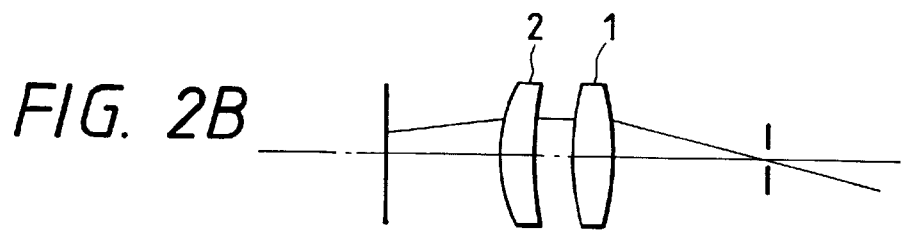

When the frame B or C replaces the frame A, the magnification is changed with the same magnification ratio. Therefore, it is possible that only one magnification-changing member is commonly used to change the magnifications in accordance with alternation between frames. For example, as shown in FIG. 2A, a finder eyepiece system 1 has a magnification α and a focal length f, and as shown in FIG. 2B, a magnifying lens 2 is placed as the magnification-changing member in front (on the object side) of the eyepiece system 1. Consequently, the magnifications can be changed in such a way that the eyepiece system 1 now has a magnification $\alpha^1$ and a focal length $f^1$.

According to the finder of the present invention, as mentioned above, in the camera provided with at least three picture-framing formats, the magnifications of two frames of finder view are selected using a common magnification-changing means. Whereby, it is possible to moderate the differences in apparent size between the frames, to maintain the visual impression. Hence, when the finder of the present invention with such a simplified construction is used, it becomes possible to obtain the compactness and cost reduction of the camera.

In accordance with the embodiments shown, the present invention will be explained in detail below.

To construct finder view frames with different aspect ratios in one device, a standard frame can be partially covered to change frame size. If three frames are to be provided, the standard frame is covered at two positions along the short or long side thereof to form each of the remaining two frames, or at one position along the short or long side thereof to form each of the remaining two frames.

It is needless to say that the latter technique allows the finder view to be used more effectively.

In the embodiments described below, it is assumed that covering one portion along either one of the short and long sides of the standard frame makes the change of frames. In this case, design is made so that the long sides of the frame A (not covered) taken as a standard are equal to those of the frame B, while the short sides of the frame A are equal to those of the frame C. Also, each of the short sides of the frame A is standardized as 1.

First Embodiment

Figure 3:
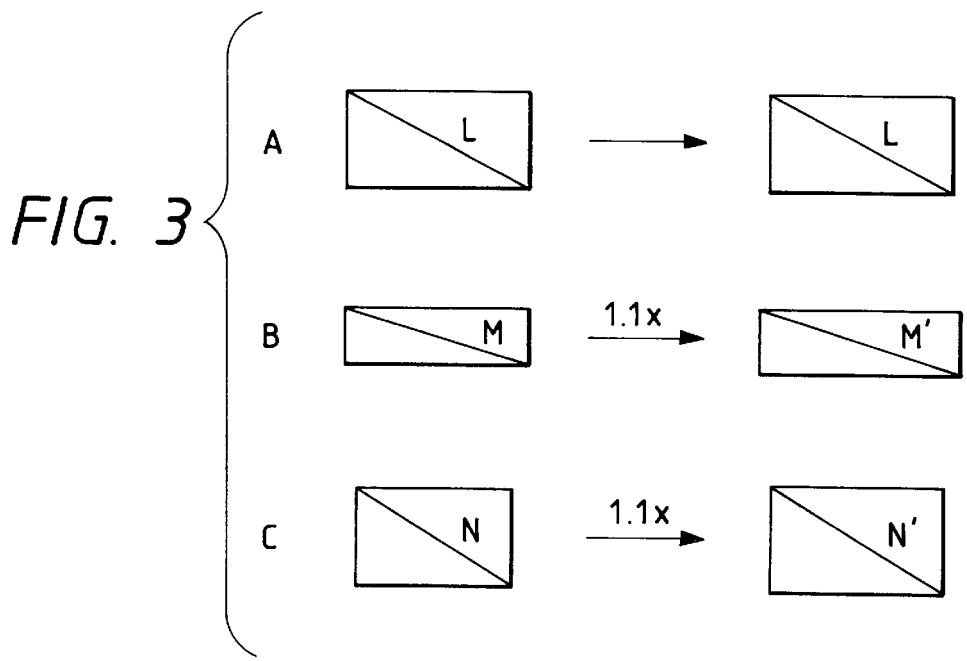
FIG. 3 is a view showing sizes of frames of the finder view where the enlargement is made according to a first embodiment of the present invention.

FIG. 3 shows the sizes of frames in this embodiment; the left-hand ones represent apparent sizes as viewed in the same standard magnification, and the right-hand ones represent apparent sizes as viewed in their respective magnifications appropriately changed. As in the figure, the aspect ratios of frames A, B, and C of the first embodiment are as follows:

Frame A 1:1.8 (conforming to the HDTV system)

Frame B 0.6:1.8 (panoramic size)

Frame C 1:1.5 (conforming to the 35 mm camera)

When the length of each of the short sides of the frame A is taken as 1, the diagonal lengths L, M, and N of the frames are

L=2.06

M=1.90

N=1.80

In this case, when the diagonal length M is considered as a standard, the values of the diagonal lengths L and N are 1.08 and 0.965, and their differences in size are +8% and −5%, respectively.

The value of the left-side member of Condition (4) is

MN−LN=0.098>0

In order to moderate the differences in apparent size between the frames viewed through the finder, it is only necessary to change the finder magnifications for the frames B and C to be a certain value (with the magnification ratio β). The value of the magnification ratio β in this case, from Eq. (6), becomes

β=2L/(M+N)=1.1

The diagonal lengths L, M', and N' after the magnification change are as follows:

L=2.06

M'=2.11

N'=2.01

Here, when the diagonal length L is considered as a standard, the values of the diagonal lengths M' and N' are 1.02 and 0.98, respectively, and their differences in size fall within the range of ±2%. That is, the apparent sizes of the frames viewed through the finder can be made nearly constant.

Figure 4A:
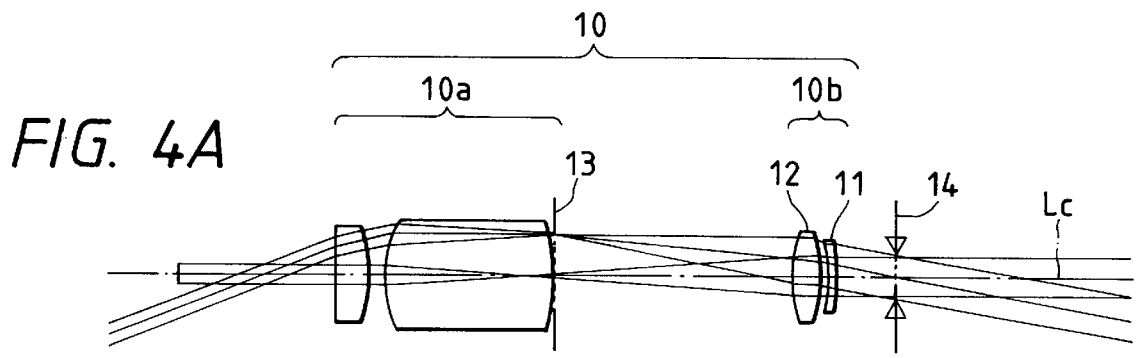
FIGS. 4A and 4B are views showing optical arrangements in the standard and magnified modes, respectively, developed along an optical axis, of the finder of the first embodiment.
Figure 4B:
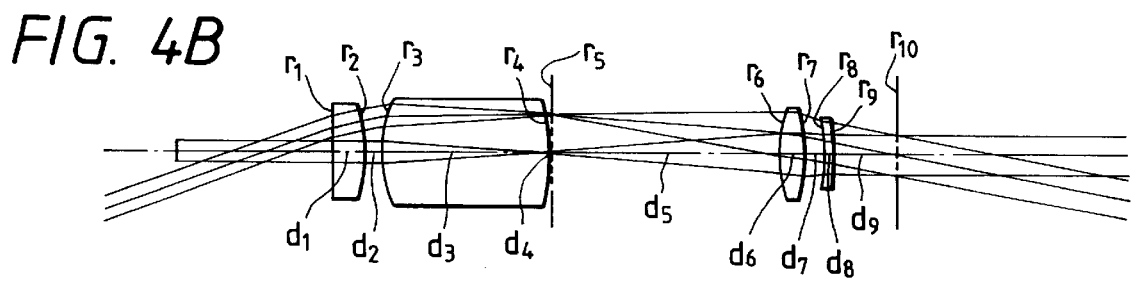

In the finder of the first embodiment, as illustrated in FIGS. 4A and 4B, an objective system 10*a* and an eyepiece system 10*b* constitute a finder 10. The eyepiece system 10*b* is moved along an optical axis Lc, thereby changing the magnification of the finder 10 (At this time, the magnification and focal distance of the eyepiece system 10b change from 0.505 and 30 mm to 0.51 and 27 mm, respectively). The eyepiece system 10b includes a negative lens 11 and a positive lens 12, which are arranged in order from the pupil side, to form a two-lens-unit arrangement. Also, reference numeral 13 denotes a field frame and 14 denotes a pupil position.

In the finder 10 of the first embodiment, as mentioned above, the eyepiece system 10b in which two lens units are arranged is moved along the optical axis Lc, and thereby the focal length of the eyepiece system 10b of the finder 10 is altered to change the magnification. The focal length is required to alternate between just two values. Therefore, it is only necessary to determine two positions of the positive lens 12 such that the distances between an intermediate image formed by the objective system 10a and respective reformed images of the intermediate image by the positive lens 12 disposed at these two positions become equal while fixedly placing the negative lens 11 with a negative power on the pupil side. Where the positive lens 12 is arranged to have such two positions, the diopter is constant, and hence a diopter adjustment is not required in changing the magnification. It is also possible that an optical system for forming an erect image is placed in the optical path of the finder of the first embodiment.

The following are numerical data of lenses constituting the finder of the first embodiment.

---

$r_1 = -186.7059$
    $d_1 = 4.0000$      $n_2 = 1.69680$      $v_1 = 55.53$
$r_2 = -19.3597$ (aspherical)
    $d_2 = 2.0000$
$r_3 = 14.3443$
    $d_3 = 21.3509$      $n_3 = 1.51633$      $v_3 = 64.15$
$r_4 = -28.0000$
    $d_4 = 0.1000$
$r_5 = \infty$ (field frame)
    $d_5 = 28.9339$ (standard mode)
            30.507 (magnified mode)
$r_6 = 21.0074$
    $d_6 = 3.0000$      $n_6 = 1.69680$      $v_6 = 55.53$
$r_7 = -20.4099$
    $d_7 = 2.5727$ (standard mode)
           1.00 (magnified mode)
$r_8 = -14.2906$
    $d_8 = 1.0000$      $n_8 = 1.65844$      $v_8 = 50.86$
$r_9 = -67.5720$
    $d_9 = 8.0000$
$r_{10} = \infty$ (pupil)
Aspherical coefficients
    Second surface
        $K = 1$
        $E = 0.93987 \times 10^{-4}$, $F = -0.16295 \times 10^{-5}$
        $G = 0.66035 \times 10^{-8}$

---

Second Embodiment

Figure 5:
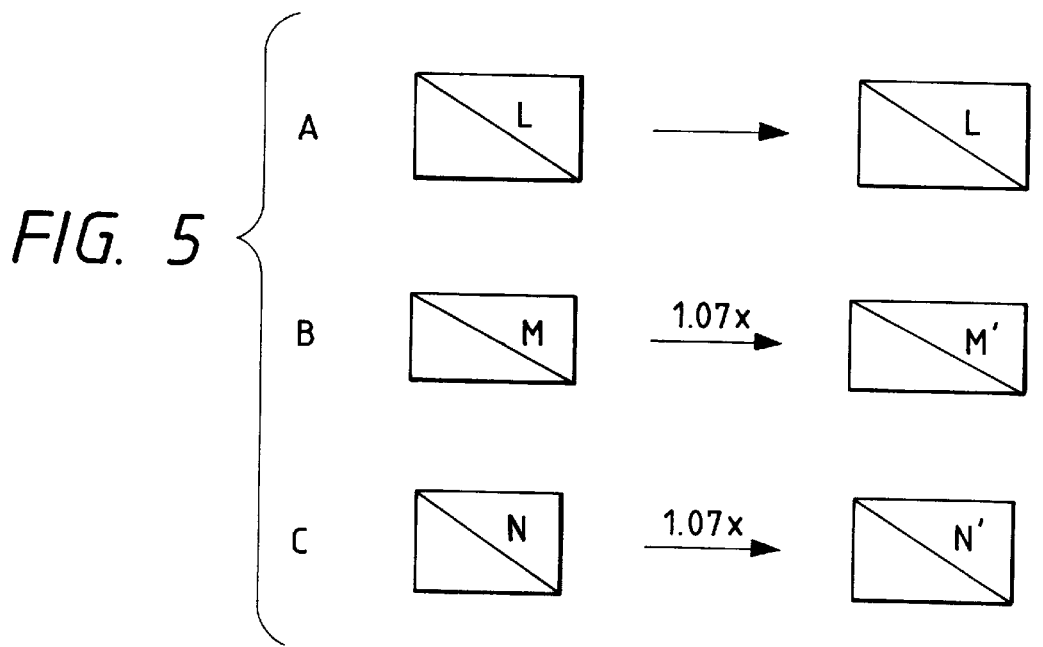
FIG. 5 is a view showing sizes of frames of the finder view where the enlargement is made according to a second embodiment of the present invention.

FIG. 5 shows the sizes of frames in this embodiment; the left-hand ones represent apparent sizes as viewed in the same standard magnification, and the right-hand ones represent apparent sizes as viewed in their respective magnifications appropriately changed. As in the figure, the aspect ratios of frames A, B, and C of the second embodiment are as follows:

Frame A 1:1.5 (conforming to the 35 mm camera)

Frame B 0.83:1.5 (conforming to the HDTV system)

Frame C 1:1.33 (conforming to the NTSC system)

When the length of each of the short sides of the frame A is taken as 1, the diagonal lengths L, M, and N of the frames are

L=1.80

M=1.71

N=1.66

In this case, when the diagonal length M is considered as a standard, the values of the diagonal lengths L and N are 1.06 and 0.97, and their differences in size are +6% and −3%, respectively.

The value of the left-side member of Condition (4) is

MN−LN=0.068>0.

In order to moderate the differences in apparent size between the frames viewed through the finder, it is only necessary to change the finder magnifications for the frames B and C to be a certain value (with the magnification ratio β). The value of the magnification ratio β in this case, from Eq. (6), becomes

β=2L/(M+N)=1.068

The diagonal lengths L, M', and N' after the magnification change are as follows:

L=1.80

M'=1.826

N'=1.773

Here, when the diagonal length L is considered as a standard, the values of the diagonal lengths M' and N' are 1.015 and 0.985, respectively, and their differences in size fall within the range of ±1.5%. That is, the apparent sizes of the frames viewed through the finder can be made nearly constant.

Figure 6A:
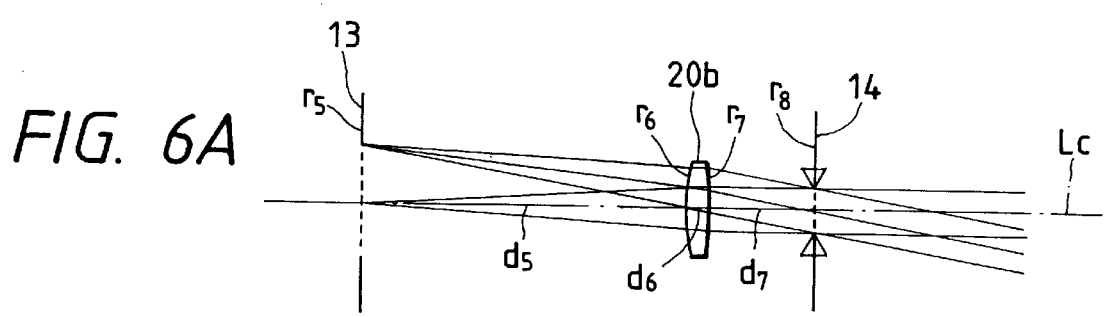
FIGS. 6A and 6B are views showing optical arrangements in the standard and magnified modes, respectively, developed along an optical axis, of an eyepiece system of the finder of the second embodiment.
Figure 6B:
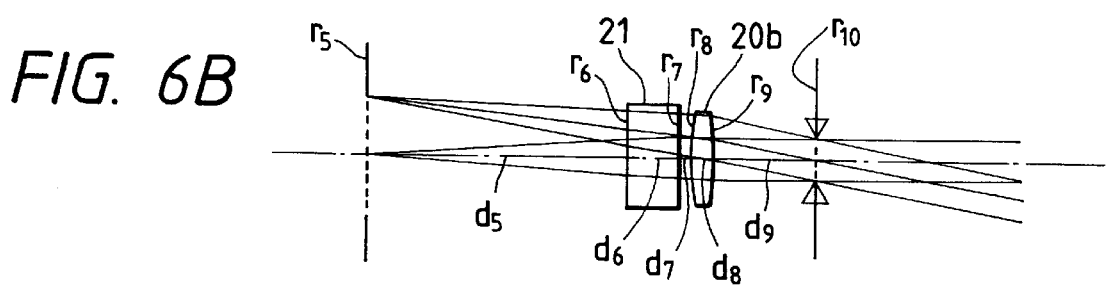

In the finder of the second embodiment, as shown in FIGS. 6A and 6B, an enlarging lens 21 is inserted in the optical path on the front side (on the object side) of an eyepiece system 20b of the finder, thereby changing the magnification of the finder (At this time, the magnification and focal distance of the eyepiece system 20b change from 7.81 and 32 mm to 8.36 and 29 mm, respectively).

In FIGS. 6A and 6B, the objective system of the finder, which is the same as that shown in the first embodiment, is omitted.

The following are numerical data of lenses constituting the finder of the second embodiment. Also, data of the first to fourth lens surfaces, which are identical with those of the first embodiment, are omitted.

---

Standard mode (where the converter lens is not inserted)
$r_5 = \infty$ (field frame)
    $d_5 = 31.0352$
$r_6 = 24.9504$
    $d_6 = 2.0000$      $n_6 = 1.51633$      $v_6 = 64.15$
$r_7 = -47.5794$
    $d_7 = 10.0000$
$r_8 = \infty$ (pupil)
Magnified mode (where the converter lens is inserted)
$r_5 = \infty$ (field frame)
    $d_5 = 24.9498$
$r_6 = 199.7877$
    $d_6 = 5.0502$      $n_6 = 1.51633$      $v_6 = 64.15$ -continued $r_7 = \infty$
  $d_7 = 1.0352$
$r_8 = 24.9504$
  $d_8 = 2.0000$     $n_8 = 1.51633$     $\upsilon_8 = 64.15$
$r_9 = -47.5794$
  $d_9 = 10.0000$
$r_{10} = \infty$ (pupil)

In the numerical data of the embodiments mentioned above, $r_1, r_2, \ldots$ represent radii of curvature of individual lens surfaces or optical members; $d_1, d_2, \ldots$ thicknesses of individual lenses or optical members, or spaces therebetween; $n_1, n_2, \ldots$ refractive indices of individual lenses; $\upsilon_1, \upsilon_2, \ldots$ Abbe's numbers of individual lenses.

Also, the configuration of the aspherical surface is expressed by the following equation:

$$Z = \frac{CY^2}{1 + \sqrt{1 - (K+1)C^2Y^2}} + EY^4 + FY^6 + GY^8$$

where Z is the coordinate in the direction of the optical axis, Y is the coordinate in the direction normal to the optical axis, C is a curvature (1/r, where r is a paraxial radius) at the vertex of the aspherical surface, K is a conic constant, and E, F, and G are aspherical coefficients of fourth, sixth, and eighth orders.

What is claimed is:

1. A finder for a camera, wherein said camera has a first picture-framing format, a second picture-framing format and a third picture framing format that are alternatively selected, said finder comprising:
   a frame shape changing means for changing a frame shape of a finder view in accordance with alternation between said first picture-framing format, said second picture-framing format, and said third picture-framing format; and
   a finder magnification changing means for changing a magnification of said finder and functioning in association with alternation between said first, second and third picture-framing formats so as to set said finder, when said first picture-framing format is selected, in a position for a first magnification, and to set said finder, when one of said second and third picture-framing formats is selected, in a position for a second magnification.

2. A finder according to claim 1, wherein a second frame and a third frame of the finder view which conform to said second picture-framing format and said third picture-framing format, respectively, are constructed based on a first frame of the finder view which conforms to said first picture-framing format, so as to be narrower than said first frame in a horizontal direction and in a vertical direction, respectively.

3. A finder according to claim 1, wherein said finder magnification changing means changes magnification by changing spaces between optical elements of an eyepiece of said finder.

4. A finder according to claim 1, wherein said finder magnification changing means changes magnification by inserting and removing an optical element in and out of an eyepiece of said finder.

5. A finder according to claim 1, wherein said first magnification and said second magnification are only alternatives for said finder magnification changing means to select.

6. A finder according to claim 1, wherein said frame shape changing means for changing a frame shape of a finder view changes the frame shape of the finder view by partially masking the finder view.

7. A finder according to claim 1, wherein a magnification ratio $\beta$ of said second magnification to said first magnification satisfies conditions:

1.8<$\beta$(M+N)/L<2.2

MM−LN>0 where L, M and N are defined as tangents of visual angles of diagonals of said first, second, and third frames, respectively, based on a supposition that each of the frames were viewed through said finder in the position for said first magnification, and are determined so that L>M>N.

8. A finder according to claim 1, wherein said finder magnification changing means changes magnification by changing position of said finder at an eyepiece thereof.

* * * * *